3,228,512
METHOD OF AND APPARATUS FOR MANIPU-
LATING ROD-SHAPED ARTICLES
Willy Rudszinat, Ruselerweg 7C, and Bernhard Schubert,
Billwerder Strasse 3, both of Hamburg-Lohbrugge,
Germany
Filed June 13, 1963, Ser. No. 287,653
Claims priority, application Germany, June 15, 1962,
H 46,078
11 Claims. (Cl. 198—30)

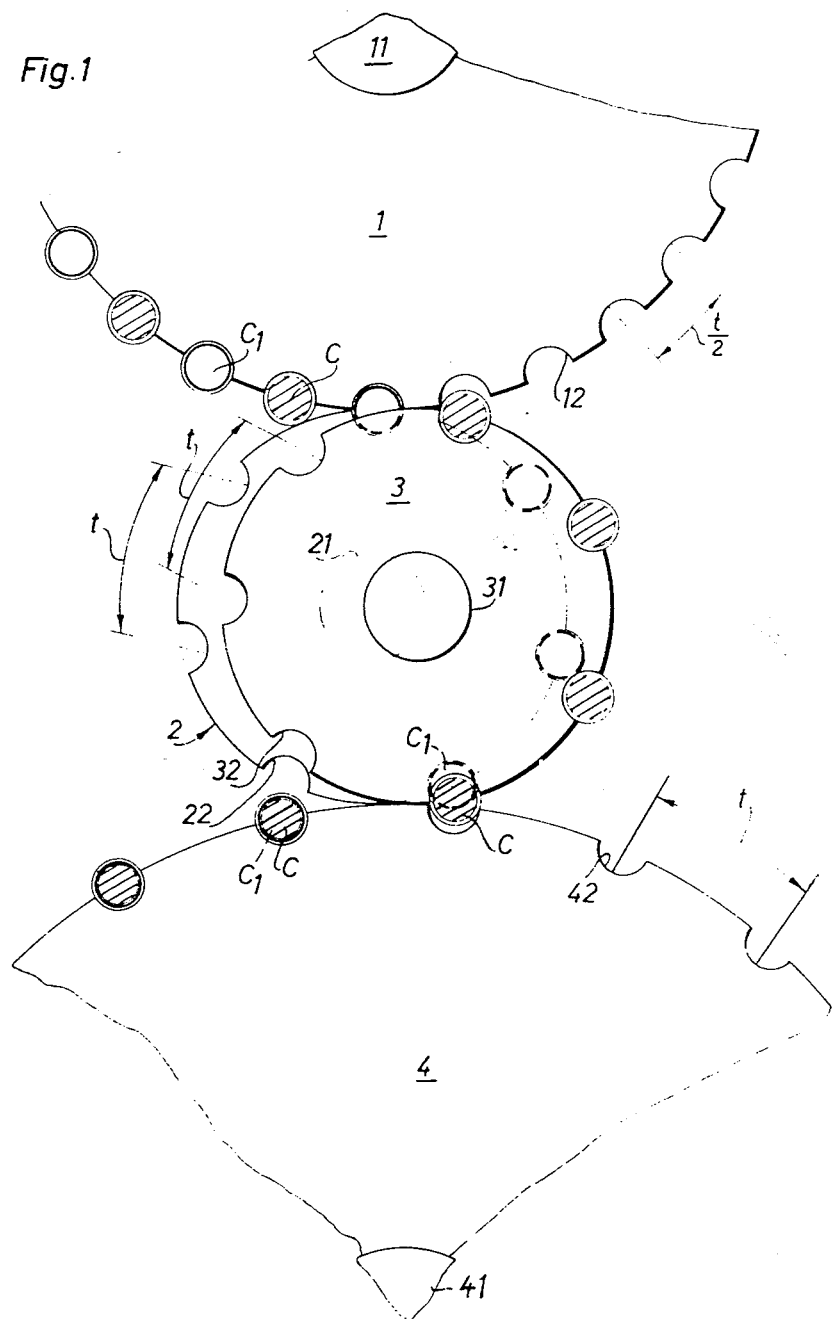

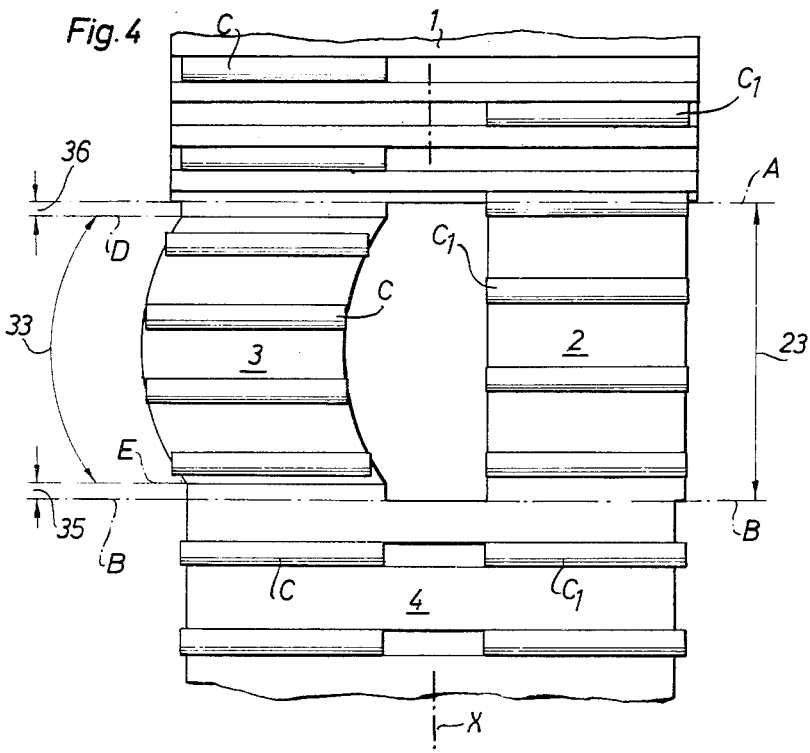
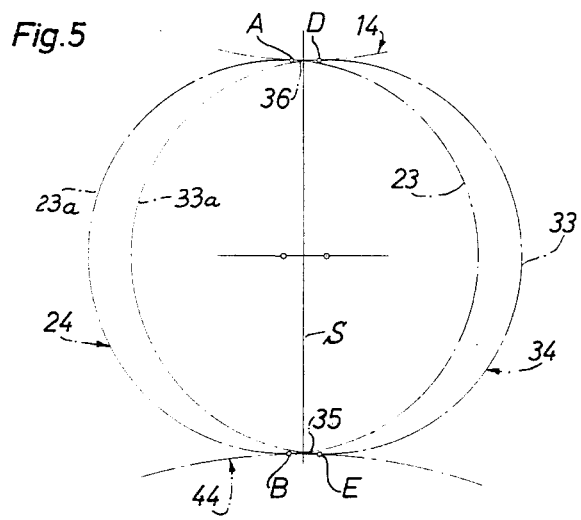

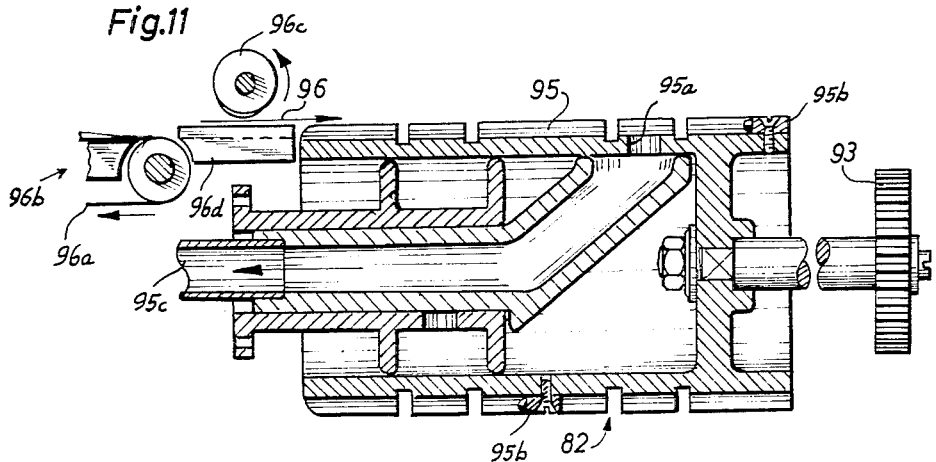
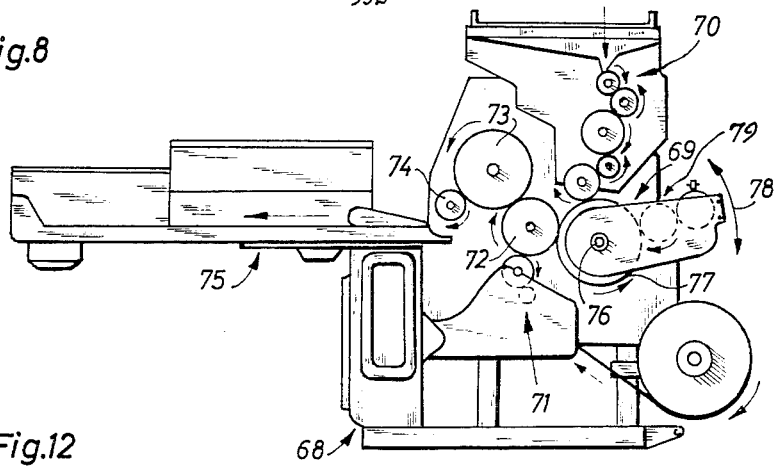
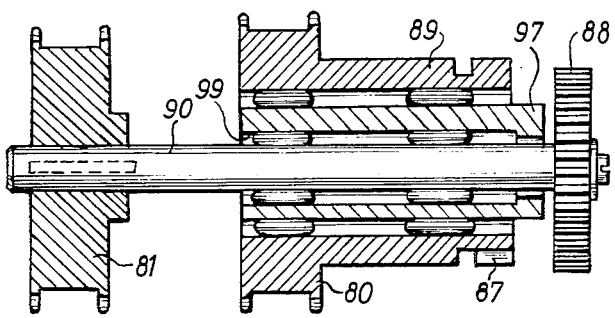
Inventors:
WILLY RUDSZINAT
BERNHARD SCHUBERT
BY Michael S. Striker
their ATTORNEY United States Patent Office 3,228,512
Patented Jan. 11, 1966

The present invention relates to a method of and to an apparatus for manipulating rows of parallel rod shaped articles, and more particularly to a method of and to an apparatus for transforming rows of transversely staggered rod shaped articles into rows in which each article of one row is coaxial with one article of each other row, or vice versa. The method and apparatus of this invention constitute an improvement over and a further development of the method and apparatus disclosed in our copending applications Serial Nos. 60,929 and 162,432, now U.S. Patents 3,164,243 and 3,164,242, respectively.

It is an important object of this invention to provide a very simple conveying arrangement which may be used in cigarette rod machines, in filter cigarette machines, in cigarillo or cigar forming machines and/or in filter forming machines, and which is constructed and assembled in such a way that it can be readily converted to operate in a sense to move rod shaped articles which form two or more rows into coaxial alignment or in a sense to move coaxially aligned articles which form two or more rows out of coaxial alignment with each other.

Another object of the invention is to provide a method of manipulating rows of rod shaped articles according to which rows of coaxial articles may be transformed into rows of transversely staggered articles or vice versa and according to which such staggering or aligning of rod shaped articles may be completed within a small area which may occupy only a small fraction of the overall space taken up by a tobacco processing of filter processing machine.

A further object of the invention is to provide a method of the just outlined characteristics which may be practiced in connection with two, three or more rows of cigarette rods, filter mouthpieces, cigars, cigarillos, filter cigarettes or similar rod shaped articles.

A concomitant object of the invention is to provide a filter cigarette machine which embodies a conveying arrangement of the above outlined characteristics.

Still another object of the invention is to provide a conveying arrangement wherein the rod shaped articles may advance at constant speed while the articles in adjacent rows change their positions with respect to each other so that the danger of losing tobacco particles from cigarettes or similar tobacco containing rods is very remote and that the rod shaped articles exhibit little tendency to leave their assigned paths even if they are advanced at speeds necessary to process them at the speed of a modern cigarette rod or filter cigarette machine.

A further object of the invention is to provide an improved cigarette feed mechanism for filter cigarette machines which embodies a conveying arrangement of the above outlined characteristics and to mount the feed mechanism in such a way that the filter cigarette machine which is provided with such a feed mechanism may be coupled directly with different types of cigarette rod machines.

An additional object of the invention is to provide a filter cigarette machine wherein the mouthpieces may be manipulated with the help of a conveying arrangement which exhibits the above outlined characteristics.

Still another object of the invention is to provide a conveying arrangement which is capable of manipulating rod shaped articles with utmost accuracy so that the articles in adjacent rows may be moved into true coaxial alignment or that the articles in adjacent rows will be staggered with respect to each other in accordance with a predetermined schedule to insure that the machine which receives rows of articles from the conveying arrangement may operate without interruptions and in a fully automatic way.

With the above objects in view, one feature of the invention resides in the provision of a first conveyor and a second conveyor each of which preferably assumes the form of a rotary drum or an endless chain with peripheral holders or pockets for reception and retention of rod shaped articles, means for feeding rod shaped articles to one of the drums, and at least two transfer members which preferably assume the form of rotary disks disposed between the conveyors and whose axes are eccentric to each other so that, while the disks transfer separate rows of rod shaped articles from the one conveyor to the other conveyor or vice versa, the articles of each row travel in a path of different length and are staggered with respect to each other if they advance from that conveyor in which they were coaxially aligned with each other or, alternatively, the articles are brought into coaxial alignment if they are being transferred from that drum on which they were transversely staggered with respect to each other. The transfer disks rotate at identical speeds.

The method of our invention comprises the steps of advancing two or more rows of parallel articles sideways along first elongated paths, preferably in a direction at right angles to the axes of the articles and maintaining the articles of one row in a predetermined position with respect to the articles of each other row, thereupon advancing the articles of each row in second paths of different length but at the same speed so that the relationship of articles which form one of such rows is changed with respect to the articles of each other row, and finally advancing the thus rearranged rows of articles along a third path. If the articles of two or more rows are in coaxial alignment while they advance in the first path, they will be staggered transversely with respect to each other when they reach the third path. On the other hand, if the articles of adjacent rows are staggered with respect to each other while advancing in the first path, they may be moved into coaxial alignment while travelling along second paths of different length so that the third path will receive rows of articles wherein each article of one row is coaxial with one article of each other row. While they advance in the first path, the distance between the articles in adjacent rows (as measured in directions at right angles to the axes of the articles) is a multiple of the distance between the articles in the third path provided that the articles were aligned in the first path but are staggered with respect to each other in the third path. The difference between such distances in the first and third paths normally depends on the number of rows, i.e., on the number of transfer members.

The novel features which are considered as characteristic of the invention are set forth in particular in the appended claims. The improved conveying arrangement itself, however, both as to its construction and its mode of operation, together with additional features and advantages there, will be best understood from the following detailed description of certain specific embodiments with reference to the accompanying drawings, in which:

FIG. 1 is a somewhat schematic fragmentary front elevational view of a conveying arrangement which embodies one form of our invention and which serves to transform two rows of transversely staggered rod shaped articles into two rows of articles wherein each article of one row is coaxial with one article of the other row, or vice versa;

FIG. 4 is a fragmentary diagrammatic end elevational view of the conveying arrangement as seen from the right-hand side of FIG. 1;

FIG. 5 is a fully diagrammatic view of the conveying arrangement with the outlines of the conveyors indicated by phantom-line circles and further showing the points at which the transfer conveyors receive and deliver rod shaped articles;

FIG. 8 is a schematic front elevational view of a filter cigarette machine whose cigarette feed mechanism embodies a conveying arrangement of the type shown in FIGS. 1 to 5;

FIG. 11 is a vertical section through the feed conveyor of the cigarette feed mechanism as seen in the direction of arrows from the line XI—XI of FIG. 9; and FIG. 12 is a vertical section through the transfer conveyors of the cigarette feed mechanism as seen in the direction of arrows from the line XII—XII of FIG. 9.

Figure 2A:
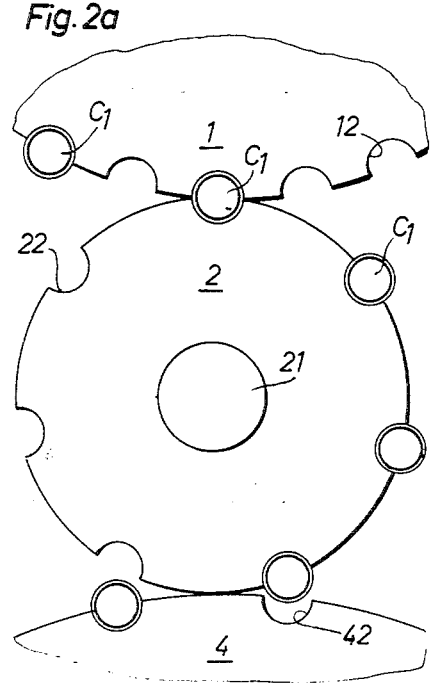
FIG. 2a is a fragmentary front elevational view of the structure shown in FIG. 1 with the front transfer conveyor omitted.
Figure 2B:
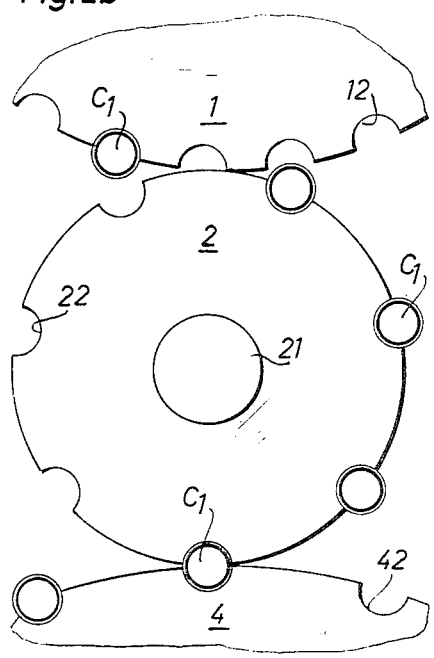
FIG. 2b illustrates the structure of FIG. 2a with the rear transfer conveyor in a different angular position which it assumes at the time a rod shaped article is being transferred into a pocket of the receiving conveyor.

Referring to the drawings, and first to FIG. 1, there is shown a conveying arrangement which embodies one form of our invention and which may be utilized in a filter cigarette machine of the type to be described in connection with FIG. 8. This conveying arrangement is adapted to serve as a means for transforming rows of transversely staggered rod shaped articles into rows of coaxial articles or vice versa and, merely for the purpose of describing the invention, it will now be assumed that two rows of rod shaped articles in which the articles of one row are staggered transversely with respect to the articles of the other row should be transformed into two rows of articles wherein each articles of one row is coaxial with but spaced from an article of the other row.

The conveying arrangement comprises a feed conveyor in the form of a drum 1 which is arranged to rotate about the axis of a shaft 11, a receiving conveyor in the form of a drum 4 which is arranged to rotate about the axis of a shaft 41, and two transfer conveyors in the form of drums or disks 2, 3, respectively arranged to rotate about the axes of shafts 21, 31. The shafts 11, 21, 31 and 41 are parallel to each other and the axis of the shaft 21 does not coincide with the axis of the shaft 31. It will be noted that the axes of the shafts 21, 31 are arranged mirror symmetrically with reference to a plane which passes through the axes of the shafts 11, 41, i.e., the axis of the shaft 21 is located at the left-hand side and the axis of the shaft 31 is located at the right-hand side of this plane.

The periphery of the drum 1 is provided with axially parallel holders or pockets 12 which are equidistant from each other and whose spacing (hereinafter called circular pitch) is $t/2$. The drum 4 is provided with similar circumferential pockets 42 with a circular pitch $t$, and each of the disks 2, 3 is also formed with axially parallel circumferential pockets 22, 32 having a circular pitch $t$, i.e., the same pitch as that of the pockets 42. The drums 1, 4 and the disks 2, 3 are driven at the same peripheral speed in such a way that the drums rotate in a counterclockwise direction and that the disks rotate in a clockwise direction. The rod shaped articles C of the first row are hatched to differentiate from the rod shaped articles $C_1$ of the second row. The arrangement is such that the rod shaped articles C alternate with the articles $C_1$ whereby the first, third, fifth, etc. pocket 12 receives an article C and the second, fourth, sixth, etc. pocket 12 receives an article $C_1$. It is to be noted that the row of articles C is spaced axially from the row of articles $C_1$; in other words, and as shown in FIG. 4, the left-hand row consisting of articles C is disposed at the one side and the right-hand row consisting of articles $C_1$ is disposed at the other side of a symmetry plane which passes midway between the axial ends of the drum 1. The disks 2, 3 are respectively aligned with the rows of articles $C_1$, C, and the axial length of the drum 4 approaches but need not equal or exceed the combined length of two articles C, $C_1$ plus the length of the space or gap therebetween. The gaps between the rows of articles are important because the conveying arrangement of FIGS. 1 to 4 is assumed to be used in a filter cigarette machine wherein pairs of coaxial articles C, $C_1$ in the form of cigarette rods are connected with mouthpieces of double unit length while being supported by or after having moved past the drum 4 to form double unit length filter cigarettes which are thereupon severed by forming a cut transversely across the center of the double unit length mouthpiece to obtain two filter cigarettes of ultimate length. It is well known in the art of filter cigarette machines to assembly two cigarette rods with a mouthpiece of double unit length and to thereupon convulate an adhesive-coated wrapper around the mouthpiece and around the adjacent end portions of the cigarette rods prior to severing the mouthpiece into two filters of identical length. Such procedure is being followed with simple mouthpieces as well as with composite mouthpieces wherein each mouthpiece consists of two or more coaxial filter plugs.

The purpose of the conveying arrangement which is shown in FIGS. 1 to 5 is to transform rows of transversely staggered cigarette rods (see the articles C, $C_1$ on the drum 1 of FIG. 4) into rows of coaxial cigarette rods (see the articles C, $C_1$ on the drum 4 of FIG. 4) so that the cigarette rods on the drum 4 will be ready to receive doube unit length mouthpieces therebetween. The manner in which the cigarette rods are being fed endwise into the pockets of the feed drum will be described in connection with FIGS. 8 to 11. It suffices to say here that a cigarette rod machine discharges the rods endwise along an elongated path in such a way that consecutive cigarette rods are axially spaced but form a single file of coaxial rods, and the peripheral speed of the drum 1 is such that the cigarette rods are discharged into consecutive pockets 12 wherein they come to rest in positions necessary to form two rows of transversely staggered articles. Each pocket 12 normally accommodates a suitable stop (not shown) which arrests the respective cigarette rod in a given position such as is necessary to convert the single file of endwise moving cigarette rods into two rows of transversely staggered cigarette rods.

Figure 3A:
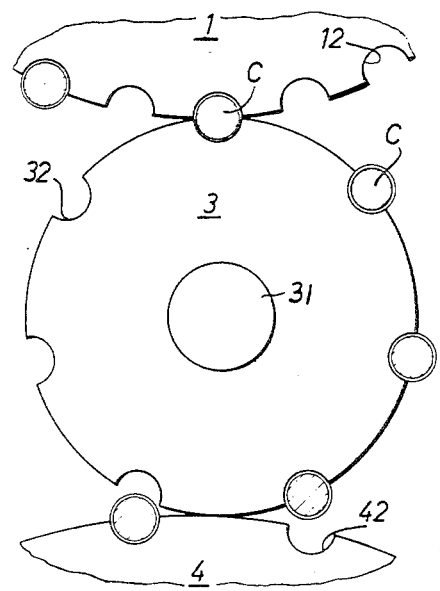
FIG. 3a is a fragmentary front elevational view of the structure shown in FIG. 1 with the rear transfer conveyor omitted.
Figure 3B:
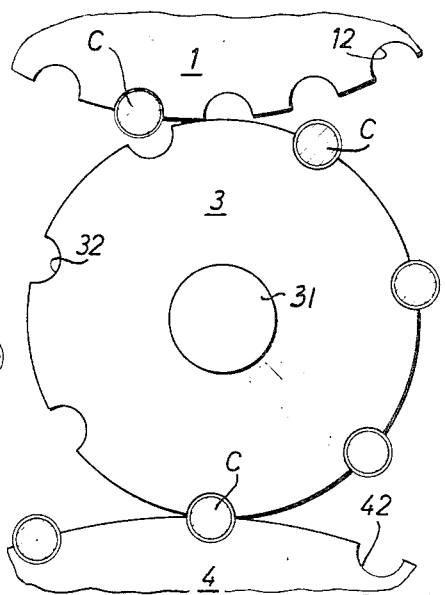
FIG. 3b illustrates the structure of FIG. 3a with the front transfer conveyor in a different angular position in which it delivers a rod shaped article into a pocket of the receiving conveyor.

Referring again to FIG. 1, it will be noted that the diameter of the disk 2 is the same as that of the disk 3; however, since the two disks are eccentric with reference to each other, the transfer points at which these disks receive consecutive rod shaped articles C, $C_1$ from the drum 1 are spaced from each other. The same applies for the transfer points between the disks and the receiving drum 4. Referring to FIG. 5 which illustrates the structure of FIG. 1 in a diagrammatic view, the phantom-line circles 14, 24, 34, 44 respectively indicate the peripheries of the members 1, 2, 3, 4, namely, the pitch circles of the respective pockets. The reference characters A and B respectively indicate the transfer points between the disk 2 and the drums 1, 4, and the reference characters D, E respectively indicate the transfer points between the disk 3 and the drums 1, 4. The vertical line S indicates a symmetry plane which passes through the axes of the drums 1, 4 and which passes between the axes of the shafts 21, 31. It will be noted that the length of the arc 23 between the transfer points A, B is less than the length of the arc 33 between the transfer points D, E. This will be readily understood by considering that two radii drawn from the axis of the disk 2 to the points A and B enclose an angle of less than 180 degrees whereas the radii extending from the axis of the disk 3 to the points D, E enclose an angle which is greater than 180 degrees. Consequently, each article C traveling along the arc 23 will be moved into axial alignment with one of the articles $C_1$ at the time the articles C reach the transfer point B. In other words, a selected pocket 22 (e.g., the one shown nearest to the apex of the disk 2 in FIG. 2a) will receive an article $C_1$ at the time the axis of this article coincides with the transfer point A of FIG. 5, and the pocket 22 nearest to the lowermost point of the disk 2 will transfer another rod $C_1$ into the registering pocket 42 of the drum 4 at the time (see FIG. 2b) when the axis of this article coincides with the transfer point B of FIG. 5. Analogously, the uppermost pocket 32 of the disk 3 will receive an artice C at the time (see FIG. 3a) this uppermost pocket 32 registers with the lowermost pocket 42 and at the time the axis of this lowermost article C on the drum 1 coincides with the transfer point D of FIG. 5. Furthermore, and as shown in FIG. 3b, the article C accommodated in the lowermost pocket 32 of the disk 3 will be transferred into the uppermost pocket 42 of the drum 4 at the time the axis of this lowermost article C on the disk 3 coincides with the lower transfer point E.

It will be noted that, whereas the diameters of the disks 2, 3 and the peripheral speeds of these disks are the same, the eccentricity of the disks renders it necessary to provide a shorter path for the articles which travel along the periphery of that disk (2) which is located upstream of the other disk (3), as viewed in the direction in which the feed drum 1 rotates.

The operation of the conveying arrangement which is shown in FIGS. 1 to 5 can be summarized as follows:

Each pocket 12 of the feed drum 1 (from the non-illustrated delivery point and up to the transfer point A) contains a rod shaped article but the articles C alternate with the articles $C_1$. Each pocket 22 of the disk 2 accommodates an article $C_1$ (along the arc 23, i.e., between the transfer points A, B) and each pocket 32 of the disk 3 accommodates an article C (along the arc 33, i.e., between the transfer points D, E). Finally, each pocket 42 of the receiving drum 4 downstream of the transfer point B accommodates two articles including an article C and an article $C_1$. In other words, owing to the fact that the circular pitch of the pockets 12 is $t/2$ and that the circular pitch of the pockets 22, 32, 42 is $t$, the rows of transversely staggered articles C, $C_1$ are transformed into rows of coaxial articles if the diameters of the disks 2, 3 are identical, if the peripheral speeds of the disks 2, 3 are identical with the peripheral speeds of the drums 1, 4, and if the difference in the length of travel of articles C, $C_1$ along the peripheries of the respective disks equals $t/2$.

Referring again to FIGS. 4 and 5, it will be noted that the distance $t/2$ equals the combined distance between the transfer points A, D (this is the distance 36) and the transfer points B, E (distance 35) plus the difference between the arcs 23, 33. In other words, the length of the arc 33 plus the distances 35, 36 equals the length of the arc 23 plus $t/2$. In FIG. 4, which is a schematic end elevational view of the conveying arrangement as seen from the right-hand side of FIG. 1, the portion of the disk 3 extending along the arc 33 is bounded by two arcuate lines to indicate that the length of this arc exceeds the length of the arc 23. Actually, and as clearly shown in FIG. 5, the transfer point A is located ahead (upstream) of the transfer point D and the transfer point B is located past (downstream of) the transfer point E, but the length of the arc 33 is sufficient to insure that each pocket will receive an article C and an article $C_1$. The difference between the lengths of arcs 23, 33 is $t/2$.

The sequence in which the articles C, $C_1$ are being transferred from the drum 1 onto the drum 4 is as follows: An article $C_1$ enters a pocket 22 at the transfer point A but the article C which is located ahead of and which is nearest to this article $C_1$ continues to travel to the point D through the distance 36 where it enters the corresponding pocket 32 of the drum 3. At the same time, an article C approaches the point E where it enters a pocket 42 whereas the nearest article $C_1$ continues to advance with the disk 2 toward the point B (through the distance 35) where it enters the same pocket 42 which has received an article C at the point E.

It goes without saying that the feed drum 1 may be replaced by a composite drum which comprises two shorter coaxial drums each provided with pockets having a circular pitch $t$. In such constructions, one shorter drum is angularly displaced with reference to the other shorter drum in such a way that each pocket of one of the shorter drums is located midway between two pockets of the other shorter drum. This will be understood by referring to FIG. 4 if one assumes that the drum 1 comprises two shorter drums disposed at the opposite sides of the plane X and that each of these shorter drums is provided only with such pockets 12 which respectively receive the articles C and $C_1$. The same applies to the receiving drum 4 with the exception that, if the drum 4 comprises two shorter drums, the pockets of each drum must be in permanent alignment to insure that each pair of aligned pockets may receive an assembly consisting of an article C and an article $C_1$.

Furthermore, and as explained hereinabove, the conveying arrangement of FIGS. 1 to 5 may be utilized for staggering rows of coaxial articles C, $C_1$ which are delivered by the drum 4 in such a way that, subsequent to their transfer onto the drum 1, the rows of coaxial articles will be transformed into rows of articles wherein the articles of one row are staggered transversely with respect to the articles of the other row. This would merely amount to a reversal of the operation by driving the drums 1, 4 in a clockwise direction at a given peripheral speed and by driving the disks 2, 3 in a counterclockwise direction at the same peripheral speed.

For the sake of clarity, the conveying arrangement of FIGS. 1 to 5 has been illustrated without any means which retain the articles C, $C_1$ in the respective pockets while such articles travel along the peripheries of the drums and along the peripheries of the respective disks. It is well known in the art of cigarette rod machines and filter cigarette machines that rod shaped articles may be retained by suction and/or by means of arcuate guides, called shields, which prevent premature discharge of articles from the respective pockets. This will be explained in greater detail in connection with FIGS. 8–12.

It will be noted that the arc 33 along which the articles C travel with the disk 3 is mirror symmetrical with reference to the arc 23a extending along that portion of the disk 2 which does not transfer any articles, and that the arc 23 is mirror symmetrical with reference to the arc 33a, i.e., to that portion of the peripheral outline of the disk 3 which does not advance articles when the disks 2 and 3 are driven in a clockwise direction. The reverse is true if the disks 2 and 3 are used to transfer articles from the conveyor 4 to the conveyor 1. Thus, the "active" peripheral portion of one of the disks is mirror symmetrical with reference to the "inactive" peripheral portion of the other disk, reference being had to the symmetry plane S of FIG. 5. The axes of the disks 2 and 3 are located in a plane which is perpendicular to the line connecting the axes of the drums 1 and 4.

Figure 6:
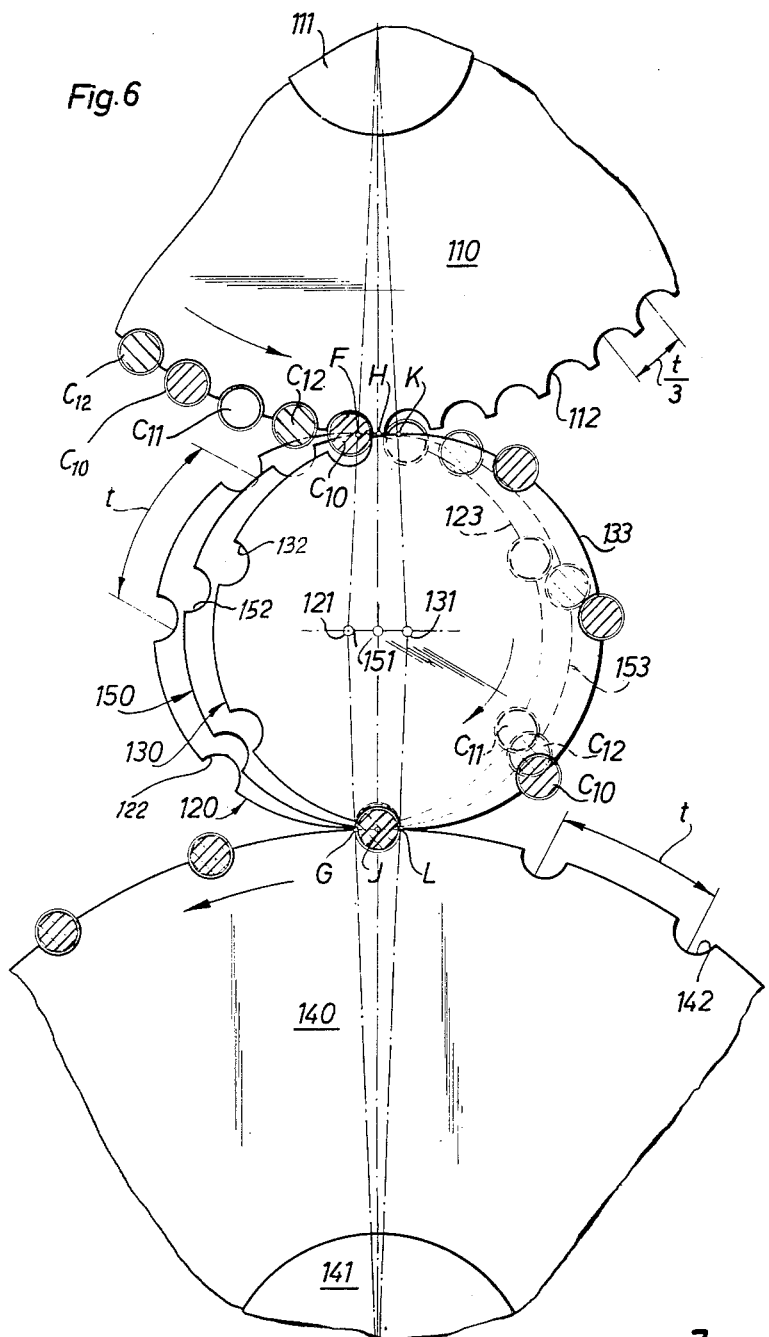
FIG. 6 is a somewhat diagrammatic fragmentary front elevational view of a modified conveying arrangement which comprises three transfer conveyors and which may be utilized for transforming three rows of transversely staggered rod shaped articles into three rows in which each article of one row is coaxial with one article in each of the other two rows, or vice versa.

FIG. 6 illustrates a second conveying arrangement which comprises a feed conveyor in the form of a drum 110 arranged to rotate about the axis of a horizontal shaft 111, a receiving conveyor 140 which also assumes the form of a drum and which is rotated about the axis of a second horizontal shaft 141, and three transfer conveyors in the form of eccentrically mounted disks 120, 130, 150 which are respectively rotatable about the axes 121, 131, 151 of three horizontal shafts which were omitted for the sake of clarity. The pockets of the drums 110, 140 are identified by numerals 112, 142, and the disks 120, 130, 150 are respectively provided with axially parallel pockets 122, 132, 152. The circular pitch of the pockets 112 is $t/3$ and the circular pitch of all of the remaining pockets is $t$.

The pockets 112 contain rod shaped articles $C_{10}$, $C_{11}$ and $C_{12}$ in the same sequence and in such a way that the row of articles $C_{12}$ which are to be transferred by the median disk 150 is located midway between the rows of articles $C_{10}$ and $C_{11}$ which are respectively transferred by the outer disks 130, 120. In other words, the articles $C_{12}$ are staggered transversely of and are spaced axially from the articles $C_{10}$, $C_{11}$ at the time these articles are accommodated in the pockets 112 of the feed drum 110. The purpose of the conveying arrangement which is shown in FIG. 6 is to move each article $C_{10}$ into coaxial alignment with an article $C_{11}$ and with an article $C_{12}$ so that the space between the articles $C_{10}$, $C_{12}$ may receive a first mouthpiece of double unit length and that the space between the articles $C_{11}$, $C_{12}$ may receive a second mouthpiece of double unit length.

The pockets 122 of the disk 120 receive consecutive articles $C_{11}$ at a first transfer point F and deliver such articles into consecutive pockets 142 at a second transfer point G so that such articles $C_{11}$ travel along an arc 123 which is somewhat less than 180 degrees. The pockets 152 of the median disk 150 receive articles $C_{12}$ at a first transfer point H and deliver such articles at a second transfer point J. The pockets 132 of the disk 130 receive articles $C_{10}$ at a first transfer point K and deliver such articles at a second transfer point L. The articles $C_{12}$ travel along an arc 153 which is exactly 180 degrees, and the articles $C_{10}$ travel along an arc 133 which is somewhat longer than 180 degrees. This will be understood by considering that the radii connecting the axis 121 with the points F, G enclose an angle of slightly less than 180 degrees, that the radii connecting the axis 151 with the transfer points H, J enclose an angle of 180 degrees, and that the radii connecting the axis 131 with the transfer points K, L enclose an angle which is greater than 180 degrees. The distance between the axes 121, 151, 131 is selected in such a way that the length of the arc 123 between the transfer points F, G equals the length of the arc 153 between the transfer points H, J plus the distance F–H plus the distance J–G minus $t/3$. Also, the length of the arc 123 between the transfer points F, G equals the length of the arc 133 between the transfer points K, L plus the distance F–K plus the distance L–G minus $2t/3$. In other words, the difference between the distances H–J and F–G is $t/3$, and the difference between the distances H–J and K–L is also $2/3$, but $$F–G < H–J < K–L$$

The diameter of the median disk 150 may be slightly smaller than the diameters of the disks 120, 130 and such difference is then in the range of a few microns. The clearance between the peripheries of the disks 120, 130, and the periphery of the drum 110 or 140 is normally in the range of 0.5 mm. The clearance between the disk 150 and the drums 110, 140 may be even less than 0.5 mm.

The conveying arrangement of FIG. 6 operates as follows:

The drums 110, 140 and the disks 120, 130, 150 rotate at the same peripheral speed and the diameters of the disks 120, 130, 150 are the same. The articles $C_{10}$ are delivered to consecutive pockets 132 at the transfer point K, the articles $C_{12}$ are delivered to consecutive pockets 152 at the transfer point H, and the articles $C_{11}$ are delivered to consecutive pockets 122 at the transfer point F. Owing to the fact that the arcs 123, 153, 133 are of different lengths, each pocket 142 will automatically receive an article $C_{10}$ (at the transfer point L), an article $C_{12}$ (at the transfer point J) and an article $C_{11}$ (at the transfer point G), i.e., any given pocket 142 will receive an article $C_{10}$ in a first step, an article $C_{12}$ in a second step, and an article $C_{11}$ in a third step.

The just described arrangement is particularly useful when the median row of articles $C_{12}$ contais cigarette rods of double unit length so that such cigarette rods of double unit length are flanked by cigarette rods $C_{10}$ and $C_{11}$ of unit length. By placing a first mouthpiece of double unit length between each cigarette rod $C_{12}$ and the corresponding cigarette rod $C_{10}$, and by placing a second mouthpiece of double unit length between each cigarette rod $C_{12}$ and the corresponding cigarette rod $C_{11}$, one obtains composite rods which contain four unit lengths of cigarette rod material and four unit lengths of mouthpiece material. If such composite rods are thereupon joined by two adhesive-coated wrappers to form a single rod of quadruple filter cigarette length, and if the thus obtained rods are severed at three points, namely, centrally across each double unit length mouthpiece and centrally across the double unit length cigarette rod $C_{12}$, one obtains four coaxial filter cigarettes.

On the other hand, the conveying arrangement of FIG. 6 may serve an entirely different purpose, namely, to form a single file of double unit length mouthpieces from three rows of double unit length mouthpieces in which each mouthpiece of one row is coaxial with one mouthpiece in each of the other two rows. For example, and assuming that the drum 140 receives in its pockets filter rods of sextuple unit length, this drum then cooperates with two cutters which sever each filter rod into three double unit length mouthpieces. Thus, at the transfer station G, each pocket 142 accommodates three coaxial mouthpieces of double unit length. The drum 140 is then rotated in a clockwise direction and the disks 120, 130, 150 are driven in a counterclockwise direction. At the time the mouthpieces are transferred into the pockets 112 which then rotate in a clockwise direction, each pocket 112 accommodates one mouthpiece of double unit length and, by using conventional wedges or similar guides which are placed next to the periphery of the drum 110 in a manner as disclosed in our copending application Serial No. 60,929, the mouthpieces contained in the pockets 112 may be shifted axially to form a single file of double unit length mouthpieces which are thereupon fed between pairs of coaxial cigarette rods, for example, into the gaps between the cigarette rods C, $C_1$ in the pockets 42 of the receiving drum 4 shown in FIG. 4.

In the just described modification of the structure shown in FIG. 6, the drum 140 serves as a feed conveyor and the drum 110 serves as a receiving conveyor. In other words, the conveying arrangement of this invention may be used to reduce the spacing between the consecutive rod shaped articles if the drum 140 is a feed conveyor, or to increase the spacing between the consecutive rod shaped articles if the drum 140 is a receiving conveyor. By expressing this versatility of the improved conveying arrangement in another way, it is immaterial whether one desires to transform rows of transversely staggered rod shaped articles into rows of coaxial articles or vice versa, and it is equally immaterial whether one desired to transfer two, three or even more rows. For example, if one would desire to provide a conveying arrangement which would manipulate seven rows of rod shaped articles, the arrangement would comprise three sets of transfer disks including three transfer disks of identical diameters (as in FIG. 6) and two pairs of transfer conveyors of different diameters.

Figure 7:
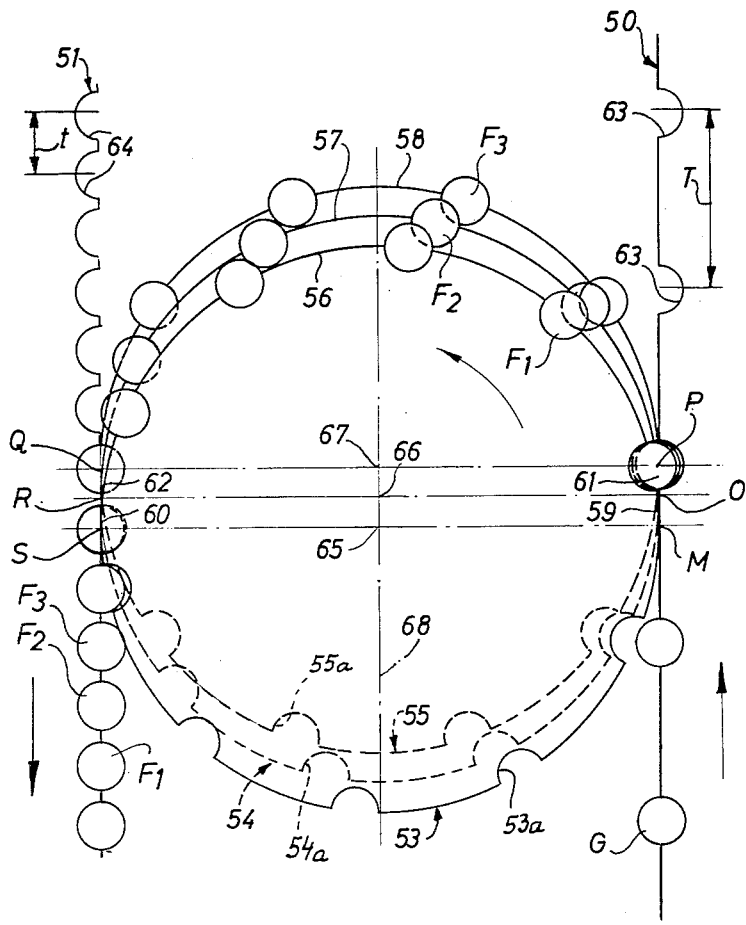
FIG. 7 is a diagrammatic fragmentary front elevational view of a third conveying arrangement wherein the drum shaped feed conveyor and the drum shaped receiving conveyor of FIGS. 1 to 6 are replaced by endless chain or belt conveyors.

Referring to FIG. 7, there is shown a third conveying arrangement which is similar to the arrangement of FIG. 6 and which also comprises three transfer conveyors in the form of disks 53, 54, 55 of identical diameter. The feed conveyor 50 assumes the form of an endless chain or band having a straight run or stringer which is tangential to the disks 53–55 and which is formed with article receiving pockets 63 having a pitch T. The receiving conveyor 51 also assumes the form of an endless chain or belt whose straight run or stringer is tangential to the disks 53–55 and is parallel with the stringer of the conveyor 50. The pitch of pockets 64 on the conveyor 51 equals $t$ wherein $T-3t$. The axes of the disks 53, 54, 55 are respectively indicated by reference numerals 65, 66, 67, and the plane 68 passing through the axes 65–67 is parallel with and is located between the stringers of the conveyors 50, 51.

The pockets 63 deliver groups G of rod shaped articles wherein each group comprises three coaxial rod shaped articles $F_1$, $F_2$, $F_3$. As already explained in connection with FIG. 6, each group G may consist of three mouthpieces of double unit length which are obtained by severing a filter rod of sextuple unit length into three sections. The pockets 53a of the disk 53 receive articles $F_1$ at a first transfer point M and deliver such articles into each third pocket 64 of the conveyor 51 at a second transfer point S. The pockets 54a of the median disk 54 receive articles $F_2$ from each consecutive pocket 63 of the feed conveyor 50 at a first transfer point O and deliver such articles into each third pocket 64 at a second transfer point R. Finally, the pockets 55a of the disk 55 receive articles $F_3$ from each consecutive pocket 63 at a first transfer point P and deliver such articles into each third pocket 64 at a second transfer point Q. The length of the arcs 56 (distance M–S), 57 (distance O–R) and 58 (distance P–Q) is the same which is contrast to the operation of the conveying arrangement shown in FIG. 6 and which is due to the fact that the stringers of the conveyors 50, 51 are parallel with each other and that such stringers are tangential to the disks 53–55. The distance M–O equals the distances O–P, Q–R and R–S. In other words, the length of each of the arcs 56, 57 and 58 is exactly 180 degrees and, consequently, the difference in the length of travel of the articles $F_1$, $F_2$ and $F_3$ must be brought about by varying the length of travel of the articles with the conveyors 50 and 51. While moving from one of the pockets 63 into the corresponding pocket 64, an article $F_1$ covers the distance 56 and moves from the transfer point M to the point S. At the same time, the article $F_2$ which is accommodated in the same pocket 63 (i.e., which forms a component part of the same group G) continues to advance with the conveyor 50 to the transfer point O to thereupon travel along the arc 57 in one of the pockets 54a prior to being delivered into a pocket 64 at the transfer point R, and this article $F_2$ then travels with the conveyor 51 toward the transfer point S. Thus, the length of the distance covered by the article $F_2$ from the point M to the point S equals the distance 59 (M–O) plus the length of the arc 57 (O–R) plus the distance 60 (R–S). The article $F_3$ which belongs to the same group G as the just described articles $F_1$ and $F_2$ covers the distance 59 (M–O), plus the distance 61 (O–P), plus the length of the arc 58 (P–Q), plus the distance 62 (Q–R), plus the distance 60 (R–S). Thus, the distances 59, 60, 61 and 62 determine the difference between the length of travel of the articles $F_1$, $F_2$ and $F_3$. As explained hereinabove, $T-3t$ and, consequently, the sum of the distances $59+60=t$ and the sum of the distances $61+62=t$. In other words, the distance between the axes 65 and 66 equals $t/2$ or $n.t/2$ and the distance between the axes 66, 67 also equals $t/2$ or $n.t/2$ wherein $n$ is a whole number.

The conveying arrangement of FIG. 7 operates as follows:

The conveyor 50 travels at a predetermined speed which equals the peripheral speed of the disks 53–55 and the forward speed of the conveyor 51. Each pocket 63 accommodates a group G consisting of three coaxial rod shaped articles $F_1$, $F_2$, $F_3$. At the first transfer point M, the pockets 53a receive consecutive articles $F_1$ and advance such articles along the arc 56 toward the transfer point S. The articles $F_2$ remain on the conveyor 50 by covering the distance 59 to the transfer point O to thereupon advance along the arc 57 and to the transfer point R. The articles $F_3$ remain on the conveyor 50 and cover the distance 59 and thereupon the distance 61 prior to entering the pockets 55a at the transfer point P to advance along the arc 58 and to the transfer point Q.

Of course, the direction of movement of the conveyors 50, 51 and of the disks 53–55 may be reversed if one desires to use the conveying arrangement of FIG. 7 for transforming three rows of transversely staggered rod shaped articles into three rows of articles in which each article of one row is coaxial with one article in each of the other two rows. Furthermore, the arrangement of FIG. 7 may be modified by providing two, four or more transfer disks and by changing the pitch of pockets on the chain conveyors in such a way that the pitch $t$ equals $T/m$ wherein $m$ is the number of transfer disks. The pitch of the pockets on the transfer disks is the same as that of the conveyor with the larger pitch T.

If the conveying arrangement comprises four or another even number of transfer members and if the feed conveyor and/or the receiving conveyor assumes the form of a drum, the transfer members include two disks of a smaller diameter and two disks of a larger diameter. The two smaller diameter disks are then disposed between the other two disks and their axes are nearer to but are located at the opposite sides of the line connecting the axis of the receiving conveyor with the axis of the feed conveyor. The axes of the larger-diameter disks are also located at the opposite sides of such connecting line.

This does not apply if the feed conveyor and the receiving conveyor assume the form of chain conveyors with parallel stringers in a manner as shown in FIG. 7. The arrangement of FIG. 7 may be used for manipulating four or more rows of rod shaped articles with four or more transfer disks each of which has the same diameter. All that counts is that the transfer points should be disposed in two parallel planes.

FIG. 8 illustrates a filter cigarette machine wherein the cigarette rods are delivered by a conveying arrangement of the type shown in FIGS. 1 to 6. This machine comprises a main frame 68, a cigarette feed mechanism 69, a mouthpiece feed mechanism 70, a wrapper feed mechanism 71, an assembly drum 72, a wrapping and drying drum 72, a cutting drum 74, and a take-off conveyor 75. This filter cigarette machine operates as follows:

The cigarette feed mechanism 69 receives cigarette rods of unit length from a conventional cigarette rod machine and assembles such cigarette rods in two rows of coaxial but spaced cigarette rods which are fed into the pockets of a receiving drum 77 forming part of the cigarette feed mechanism 69. The gaps between the pairs of coaxial cigarette rods receive double unit length mouthpieces which are delivered by the mouthpiece feed mechanism 70 into the pockets of the receiving drum 77, and the thus obtained assemblies consisting of two cigarette rods and of a double unit length mouthpiece therebetween are thereupon transferred into the pockets of the assembly drum 72 which revolves in a clockwise direction and which receives adhesive-coated wrappers from the wrapper feed mechanism 71 in such a way that each group is provided with a separate wrapper extending along the mouthpiece and along the adjacent end portions of the respective cigarette rods. After being transferred onto the wrapping drum 73, the assemblies are caused to rotate about their respective axes whereby the wrappers are convoluted around the mouthpieces and around the adjacent end portions of the respective cigarette rods to form double unit length filter cigarettes which are severed transversely across the wrapped mouthpieces while advancing along the periphery of the drum 74 so that each double unit length filter cigarette is halved into two filter cigarettes of ultimate length. Such filter cigarettes are then advanced by the take-off conveyor 75 toward a transfer station at which they are stacked in suitable trays, not shown.

In addition to being provided with a conveying arrangement of the type shown in FIGS. 1 to 6, the cigarette feed mechanism 69 embodies another important feature in that this mechanism is rockable as a unit to pivot about the axis of the shaft 76 of the receiving conveyor 77 (see the double-headed arrow 78) so that the feed conveyor of the mechanism 69 may be aligned with the discharge end of a higher or lower cigarette rod machine. Thus, if the cigarette rod machine discharges a continuous stream of coaxial cigarette rods which move endwise at a certain distance above the ground, the entire feed mechanism 69 may be readily adjusted in such a way that its feed conveyor will be in proper position to receive consecutive cigarette rods from such machine.

Figure 9:
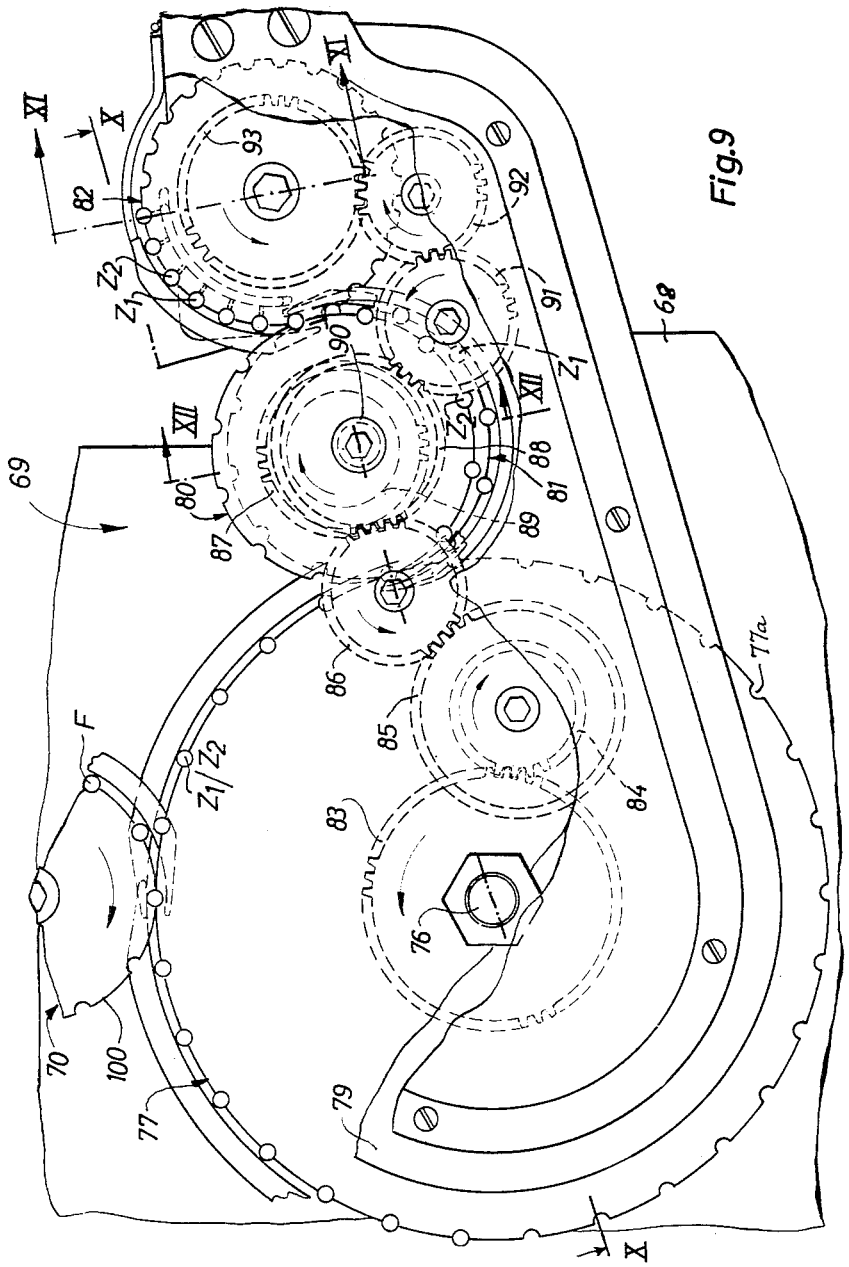
FIG. 9 is an enlarged front elevational view of the cigarette feed mechanism with a portion of its housing broken away.

The cigarette feed mechanism 69 is shown in greater detail in FIG. 9. It comprises the aforementioned receiving conveyor in the form of a drum 77 which actually constitutes a first assembly drum because the last drum 100 of the filter feed mechanism 70 delivers double unit length mouthpieces F into the pockets 77a as the pockets 77a advance beneath the drum 100 and after each of these pockets has received a pair of coaxial but spaced cigarette rods $Z_1$, $Z_2$. The shaft 76 of the drum 77 is mounted in the machine frame 68 and serves as a pivot for a plate-like carrier or housing 79 which supports the shaft of a feed conveyor 82 corresponding to the conveyor 1 of FIG. 1 and two transfer disks 80, 81 which respectively correspond to the disks 2 and 3 of FIG. 1. The parts of the cigarette feed mechanism 69 are driven by a first spur gear 83 which is mounted on the shaft 76 of the receiving conveyor 77 (the latter corresponding to the drum 4 of FIG. 1) and which forms part of a gear train including three intermediaate gears 84, 85, 86 the last of which drives the gears 87, 88 of the disks 80, 81 which are respectively mounted on parallel shafts 89, 90. Thus a single gear 86 may drive both transfer disks. The gear 88 drives two intermediate gears 91, 92 the latter of which drives the gear 93 of the feed drum 82. It will be noted that the gear 84 will merely roll along but will remain in mesh with the driver gear 83 when the operator decides to pivot the housing 79 about the axis of the shaft 76. The shaft 76 is driven by a gear train 76a from the main drive of the filter cigarette machine.

Figure 10:
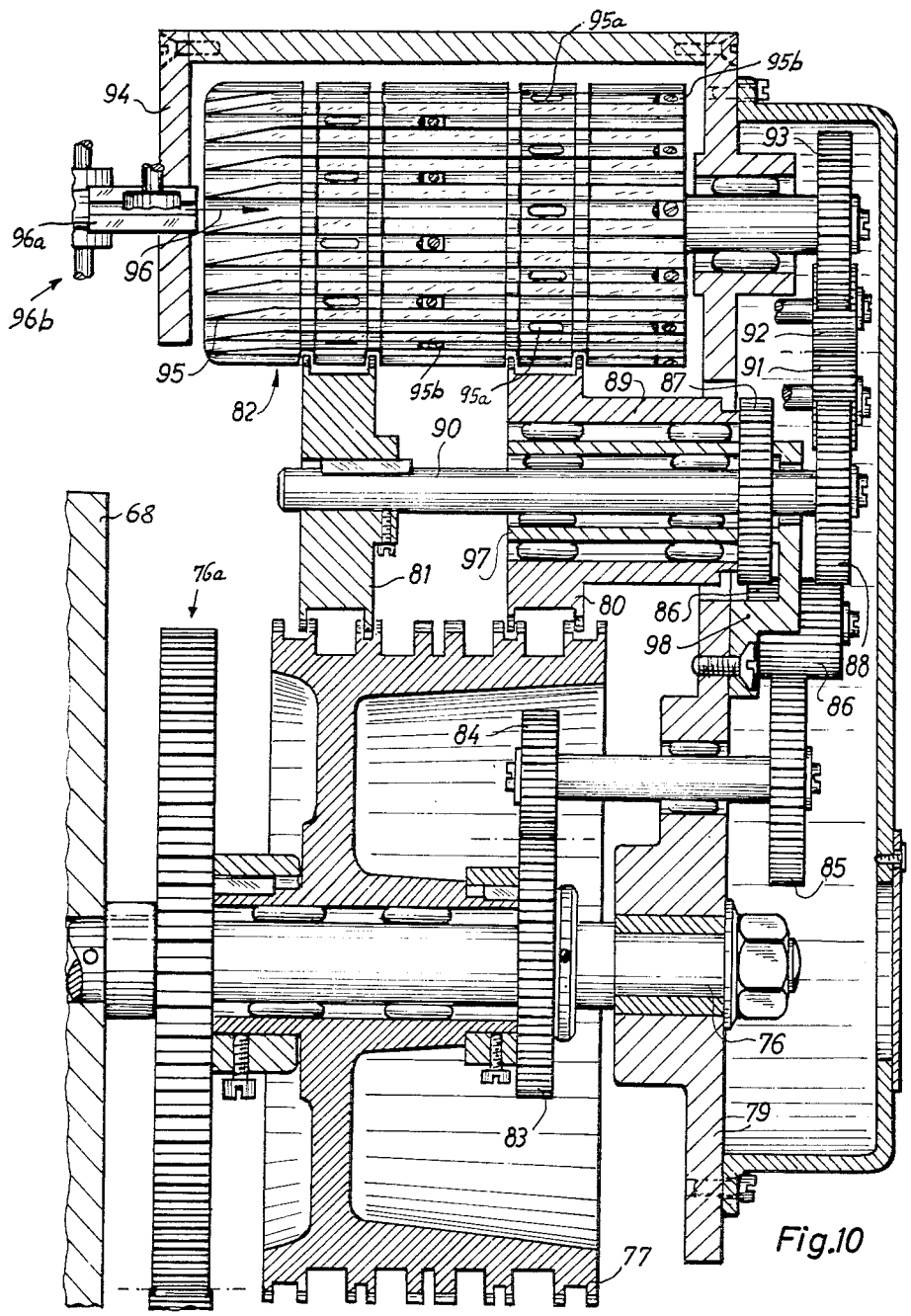
FIG. 10 is a horizontal section through the cigarette feed mechanism as seen in the direction of arrows from the line X—X of FIG. 9.

The gear train 83–88, 91–93 is shown again in FIG. 10 which also illustrates the manner in which the shafts of these gears are mounted in the housing 79 and the manner in which the drums 82, 77 cooperate with the disks 80, 81 to transfer pairs of cigarette rods $Z_1$, $Z_2$ and mouthpieces F into the pockets of the assembly drum 72. The housing 79 comprises an L-shaped extension in the form of a composite bracket 94 which straddles the discharge conveyor 82 and which extends beneath the discharge conveyor 96a of a cigarette rod machine 96b. The conveyor 96a delivers cigarette rods $Z_1$, $Z_2$ endwise in the direction indicated by an arrow 96 and, since the housing 79 is pivotable about the axis of the shaft 76 (which is rotatable in the machine frame 68), the discharge end of the conveyor 96a may be brought into registery with the uppermost pocket 95 of the feed drum 82. The drum 82 is a suction drum and each of its pockets 95 is formed with several suction ducts 95a which attract the cigarette rods to insure that the rods remain in the respective pockets while advancing toward the transfer points between the drum 82 and the disks 80, 81. The steps for the cigarette rods $Z_1$ and $Z_2$ in the pockets 95a are shown at 95b. If desired, the disks 80, 81 may be driven by internal gears.

FIG. 11 illustrates the interior of the feed drum 82 and a suction conduit 95c which communicates with selected ducts 95a when the drum rotates. An accelerating roller 96c disposed above a bridge member 96d serves to accelerate the cigarette rods $Z_1$ and $Z_2$ as the rods advance beyond the discharge end of the conveyor 96a.

FIG. 12 illustrates the manner in which the hollow shaft 89 of the disk 80 is mounted on the shaft 90 of the disk 81. The shaft 90 rotates in a bearing sleeve 97 which is secured to a bracket 98, see FIG. 10. The sleeve 97 has an eccentric bore 99 for two sets of roller bearings which surround the shaft 90. The eccentricity of the bore 99 is selected in such a way that the disks 80, 81 will transfer pairs of coaxial cigarette rods $Z_1$, $Z_2$ into the pockets 77a of the receiving drum 77.

The cigarette feed mechanism 69 of FIGS. 9 to 12 operates as follows:

The conveyor 96a discharges a single file of cigarette rods $Z_1$, $Z_2$ (arrow 96) onto the bridge member 96d whereon the cigarettes are engaged by the accelerating cam roller 96c and are advanced into the respective pockets 95 so that each cigarette rod comes to a halt when it abuts against the corresponding stop 95a. It will be noted that these stops are arranged in two rows in order to align the row of cigarettes $Z_1$ with the disk 81 and to align the row of cigarette rods $Z_2$ with the disk 80. The pockets 95 retain the respective cigarette rods by suction and deliver them into the pockets of the disks 80, 81 whereon the rods are aligned so that each pocket 77a receives a cigarette rod $Z_1$ and a cigarette rod $Z_2$. While the pairs of coaxial cigarette rods advance beneath the drum 100 of the filter feed mechanism 70, this mechanism discharges a double unit length mouthpiece F between each pair of consecutive cigarette rods so that the pockets of the assembly drum 72 will receive assemblies which consist of two unit-length cigarette rods and a mouthpiece of double unit length. The remainder of the operation of the filter cigarette machine has been described hereinbefore.

In all embodiments of our improved arrangement, the pockets or similar holders for rod shaped articles are preferably formed in such a way that the articles are received with some clearance to facilitate transfer of such articles to and from the transfer members.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A conveying arrangement for a plurality of parallel rod shaped articles, comprising a feed conveyor arranged to receive rows of rod shaped articles and to advance such rows in a direction at right angles to the longitudinal extensions of the articles while maintaining the articles of each row in parallelism with and at a fixed distance from each other; a receiving conveyor spaced from said feed conveyor; a plurality of substantially identically dimensioned rotary transfer members, one for each row of articles, said transfer members being disposed between said conveyors to rotate about spaced parallel axes and each thereof being arranged to advance consecutive articles of the respective row through a different distance from the first transfer point where it receives articles from said feed conveyor to a second transfer point where it delivers articles to said receiving conveyor so that the relationship of articles in the rows on said receiving conveyor is different from the relationship of articles in the rows on said feed conveyor, said first and second transfer points being respectively spaced from each other; and means for rotating said transfer members at identical speeds.

2. A conveying arrangement as set forth in claim 1, wherein said transfer members are disks having identical numbers of axially parallel peripheral holding means for the respective articles.

3. A conveying arrangement as set forth in claim 2, comprising an even number of disks including a first pair of disks having a first diameter and a second pair of disks having a second diameter.

4. A conveying arrangement as set forth in claim 2, comprising an odd number of transfer disks including a median disk and two outer disks of identical diameter.

5. A conveying arrangement as set forth in claim 1, wherein each of said conveyors comprises parallel article receiving holders and wherein the pitch of holders on one of said conveyors is $n.t$ wherein $n$ is the number of transfer members and $t$ is the pitch of holders on the other conveyor.

6. A conveying arrangement as set forth in claim 1, wherein said conveyors are rotary drums each having a plurality of equidistant axially parallel peripheral article receiving pockets.

7. A conveying arrangement as set forth in claim 1, wherein said transfer members are disks each mounted on antifriction bearings and each comprising internal gear means serving to drive the respective disks.

8. A conveying arrangement as set forth in claim 1, wherein said conveyors have portions which are parallel to each other and wherein said transfer points are located in the planes of the respective portions.

9. A method of manipulating rows of parallel rod shaped articles, comprising the steps of advancing at least two rows of articles side-by-side in first elongated paths in directions at right angles to the longitudinal extensions of the articles and maintaining the articles of each row at a predetermined distance from each other in the longitudinal direction of said first paths and at a predetermined distance from the articles of each other row in a direction transversely of said first paths; thereupon advancing the articles of each row in second paths while the articles remain parallel to each other and in such a way that the articles of each row cover a distance of different length but travel in the same general direction and at the identical speeds whereby the position of articles in each row is changed with respect to the position of articles in each other row; and advancing the articles in third paths in directions at right angles to the longitudinal extensions of the articles and in such a way that the relationship of the articles in adjacent rows remains unchanged.

10. A method of manipulating rows of parallel rod shaped articles, comprising the steps of advancing at least two rows of articles side-by-side in first elongated paths in which the articles move sideways and maintaining the articles of each row at a predetermined distance from each other in the longitudinal direction of said first paths and from the articles in each other row in a direction transversely of said first paths; advancing the articles of each row sideways in second paths in parallelism to each other and in such a way that the articles of each row cover a distance of different length but travel in the same general direction and at identical speeds whereby the position of articles in one row is changed with reference to the position of articles in each other row; and advancing the articles sideways in third paths and in such a way that the relationship of the articles in adjacent rows remains unchanged.

11. A method as set forth in claim 10, wherein said second paths are portions of circular paths having substantially identical radii and having centers of curvature located on a line which is normal to the longitudinal extensions of the articles.

References Cited by the Examiner

UNITED STATES PATENTS

| | | | |
|---|---|---|---|
| 3,010,561 | 11/1961 | Ricke | 198—32 |
| 3,036,581 | 5/1962 | Dearsley | 198—32 X |

OTHER REFERENCES

German application DAS 1,099,921, Feb. 16, 1961.

SAMUEL F. COLEMAN, *Primary Examiner.*

EDWARD A. SROKA, *Examiner.*